(12) United States Patent
Yamada

(10) Patent No.: US 6,445,339 B1
(45) Date of Patent: Sep. 3, 2002

(54) FM-CW RADAR APPARATUS

(75) Inventor: Yukinori Yamada, Toyota (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 09/698,018

(22) Filed: Oct. 30, 2000

Related U.S. Application Data

(63) Continuation-in-part of application No. PCT/JP99/07484, filed on Mar. 24, 1999.

(30) Foreign Application Priority Data

Apr. 28, 1998 (JP) ............................................. 10-118584

(51) Int. Cl.⁷ .............................................. G01S 13/32
(52) U.S. Cl. .......................... 342/128; 342/73; 342/74; 342/81; 342/147; 342/158; 342/195; 342/196; 342/368; 342/374
(58) Field of Search ................................ 342/128–133, 342/147–158, 175, 195, 120, 368–377, 428–440, 192, 193, 194, 196, 197, 73, 74, 81

(56) References Cited

U.S. PATENT DOCUMENTS

| | | |
|---|---|---|
| 4,107,692 A | 8/1978 | Hutcheon et al. |
| 4,150,375 A | 4/1979 | Ross et al. |
| 4,294,235 A | 10/1981 | Fujisaka |
| 5,369,409 A | 11/1994 | Urabe et al. |
| 5,579,010 A | 11/1996 | Iihoshi et al. |
| 5,617,098 A | 4/1997 | Koyanagi et al. |
| 5,731,778 A | 3/1998 | Nakatani et al. |
| 5,955,991 A * | 9/1999 | Kawakubo ................... 342/374 |

FOREIGN PATENT DOCUMENTS

| | | |
|---|---|---|
| EP | 0 618 641 A2 | 10/1994 |
| EP | 0 690 315 A2 | 1/1996 |
| EP | 0 805 360 A2 | 11/1997 |
| EP | 0 898 174 A1 | 2/1999 |
| EP | 0 919 828 | 6/1999 |
| GB | 2 249 685 A | 5/1992 |
| JP | 4-313091 A | 11/1992 |
| JP | 7-5252 A | 1/1995 |
| JP | 7-120547 A | 5/1995 |
| JP | 7-318635 A | 12/1995 |
| JP | 8-136646 A | 5/1996 |
| JP | 9-152477 A | 1/1997 |
| JP | 9-222474 A | 8/1997 |
| JP | 10-282228 A | 10/1998 |

* cited by examiner

*Primary Examiner*—Bernarr E. Gregory
(74) *Attorney, Agent, or Firm*—Finnegan, Henderson, Farabow, Garrett & Dunner, L.L.P.

(57) ABSTRACT

This FM-CW radar apparatus comprises a transmitter section, a receiver section, and a signal processing section. The transmitter section transmits a frequency-modulated continuous wave as a transmitted wave. The receiver section receives a radio wave resulting from reflection of the transmitted wave at a target, as a received wave, by a receiving antenna comprising an array of antenna elements, generates a beat signal which is a difference of the transmitted wave and the received wave in each of channels of the respective antenna elements, and converts this beat signal to a digital beat signal by A/D conversion. The signal processing section executes a digital beamforming operation with the digital beat signals and detects the target from the result of the operation. The receiver section has a switch means for selectively connecting either one of the antenna elements to a circuit for generating the beat signal, and this switch means connects only part of the antenna elements to the beat signal generating circuit in one period of the repetition periods of the frequency modulation.

5 Claims, 7 Drawing Sheets

FM-CW RADAR APPARATUS

RELATED APPLICATION

The present application is a continuation-in-part application of PCT application No. PCT/JP99/01484 filed on Mar. 24, 1999, designating U.S.A. and now pending.

BACKGROUND OF THE INVENTION

1. Field of the invention

The present invention relates to an FM-CW radar apparatus using a frequency-modulated continuous wave as a transmitted wave and, more particularly, to the FM-CW radar apparatus that can accomplish a beam scan by digital beamforming (DBF).

2. Related Background Art

An example of the DBF radar apparatus is one described in Japanese Patent Application Laid-Open No. 6-88869. In this conventional radar apparatus, an RF amplifier, a mixer, a filter, and an A/D converter are connected to each of antenna elements constituting an array antenna, digital signals outputted from the respective A/D converters are read into a digital beamforming processor, and the digital beamforming processor carries out the digital beamforming operation, based thereon.

SUMMARY OF THE INVENTION

Generally speaking, the radar apparatus uses high-frequency electromagnetic waves such as microwaves or millimeter waves, but analog devices (such as the RF amplifiers and mixers) operating at such high frequencies are very expensive.

The conventional radar apparatus described above necessitates a number of analog devices, because such analog devices are given to each of the antenna elements. Therefore, the production cost becomes inevitably high. Particularly, it is conceivable as a means for improving the performance that the number of antenna elements is increased, but the increase of the antenna elements also increases the number of high-frequency analog devices attendant thereon, thereby increasing the cost. It was thus difficult to increase the number of antenna elements. In addition, the increase of analog devices also increases the scale of the radar apparatus.

An object of the present invention is to provide an FM-CW radar apparatus including the minimum number of analog devices, regardless of the number of antenna elements.

The FM-CW radar apparatus of the present invention comprises a transmitter section, a receiver section, and a signal processing section. The transmitter section transmits a frequency-modulated continuous wave as a transmitted wave. The receiver section receives radio waves resulting from re-radiation from a target, as received waves, through a receiving antenna comprised of an array of antenna elements, generates a beat signal which is a difference between the transmitted wave and a received wave in each of channels of the respective antenna elements, and converts this beat signal to a digital beat signal by A/D conversion. The signal processing section executes the digital beamforming operation with the digital beat signals to detect the target from the result thereof.

The receiver section comprises switch means for selectively connecting either one of the antenna elements to a circuit for generating a beat signal and this switch means connects only part of the antenna elements to the beat signal generating circuit in one period of repetition periods of frequency modulation.

With the FM-CW radar apparatus of the present invention constructed as described above, because the switch means selectively connects either one of the antenna elements in sequence to the circuit for generating the beat signal, the received waves through the respective antenna elements can be supplied in time division to the circuit for generating the beat signal. There is thus no need to prepare the high-frequency devices, such as the mixer circuit etc. for down-conversion of the received wave, for each of the antenna elements, and only one set will suffice.

In addition, since the switch means connects less than all of the antenna elements to the beat signal generating circuit in one of repetition periods of the frequency modulation, the switching frequency may be lower than that in the case wherein all the antenna elements are connected to the beat signal generating circuit in one of repetition periods of the frequency modulation.

Since the A/D conversion is considered to be carried out based on sampling of a beat signal every switching of connection, an A/D conversion rate may also be reduced with decrease of the switching frequency.

It is desirable that the switch means should select one antenna element as a reference antenna element in each of repetition periods of the frequency modulation and that the signal processing section should correct phases of waves received by the antenna elements other than the reference antenna element, based on a phase difference of a wave received by the reference antenna element in each of repetition periods of the frequency modulation.

Between different periodic intervals of repetition periods of the frequency modulation, the distance to the target may vary during a time difference. In that case, there will occur a difference between phases of received waves. Namely, sufficient simultaneity of reception is not assured for every antenna element. In contrast with it, since the apparatus is constructed to detect a phase difference of a signal from the reference antenna element in each period and to correct phases of signals of the antenna elements other than the reference antenna element, based on this phase difference, the apparatus may perform the DBF synthesis almost equivalent to that in the case wherein the signals from all the antenna elements are read in one period.

DESCRIPTION OF THE PREFERRED EMBODIMENTS

Figure 1:
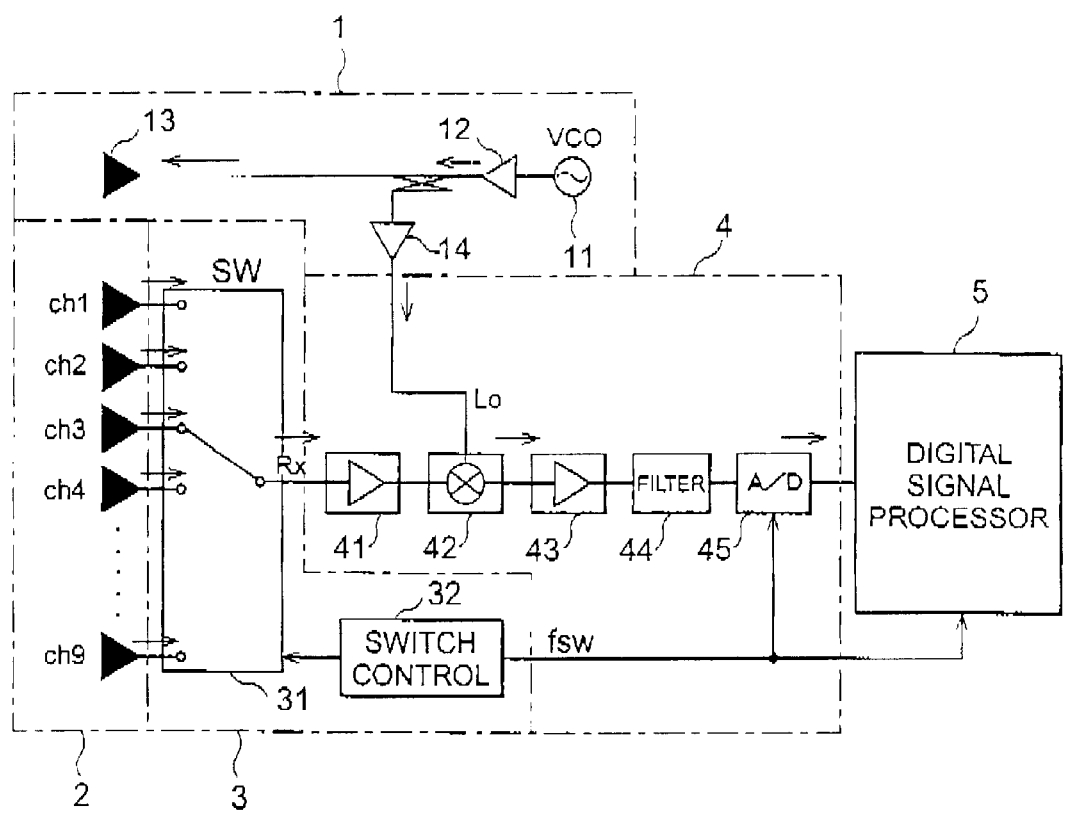
FIG. 1 is a structural diagram to show an FM-CW radar apparatus as an embodiment of the present invention.

FIG. 1 is a structural diagram to show a radar apparatus as an embodiment of the present invention. This radar apparatus is an FM-CW radar apparatus designed to use a frequency-modulated (FM) continuous wave (CW) as a transmitted signal and a DBF radar apparatus designed to execute the digital beamforming operation.

Prior to the description of specific structure and operation of the present embodiment, the principle of detection of the FM-CW radar apparatus will be described.

FIGS. 2A, 2B, 3A, and 3B are waveform diagrams to show the principle of detection of the FM-CW radar.

Figure 2A:
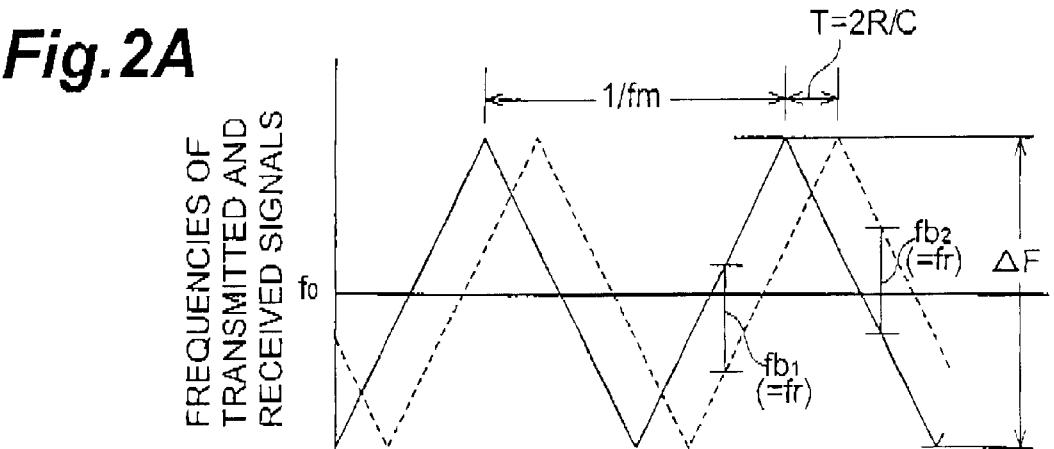
FIG. 2A is a graph for explaining the principle of detection of the FM-CW radar.

FIG. 2A is a graph to show change in the frequency of the transmitted signal and change in the frequency of a received signal resulting from re-radiation from a target at the position of distance R and with the relative velocity of zero, in which the frequencies are on the vertical axis while the time on the horizontal axis. The solid line indicates the frequencies of the transmitted signal and the dashed line the frequencies of the received signal.

As seen from this graph, the transmitted signal is a modulated signal resulting from triangular frequency modulation of a continuous wave. The center frequency of the modulated wave is f0, a frequency shift width is ΔF, and the repetition frequency of the triangular wave is fm.

Figure 3A:
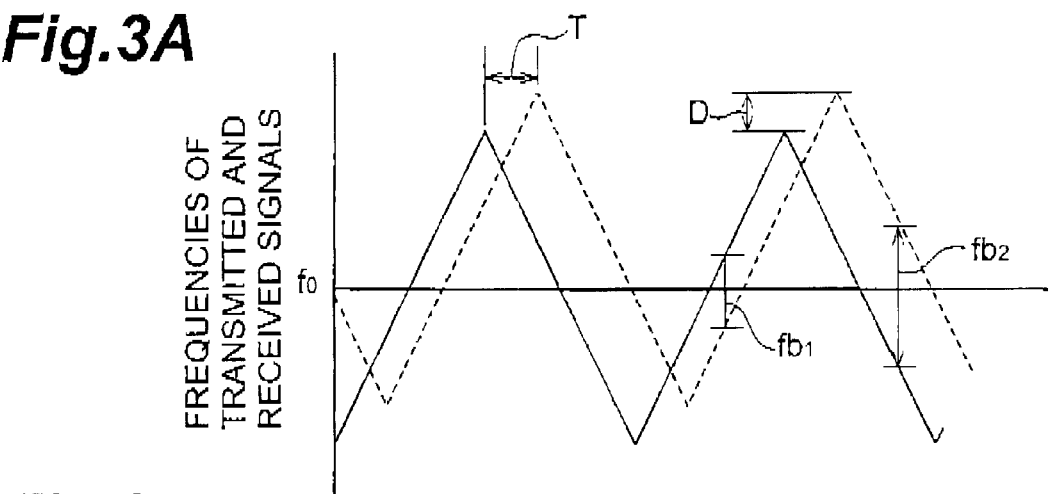
FIG. 3A is a graph for explaining the principle of detection of the FM-CW radar.

FIG. 3A is a graph to show change in the frequency of the transmitted signal and change in the frequency of a received signal where the target has a relative velocity V except for zero, in which the solid line indicates the frequencies of the transmitted signal while the dotted line the frequencies of the received signal. The definition of the transmitted signal and the coordinate axes is the same as in FIG. 2A.

As illustrated in FIG. 2A, when the relative velocity of the target is zero, the received signal has a time lag T (T=2R/C: C is the speed of light) according to the distance with respect to the transmitted signal.

As illustrated in FIG. 3A, when the relative velocity of the target is V except for zero, the received signal has the time lag T according to the distance with respect to the transmitted signal and a frequency deviation D corresponding to the relative velocity. In the example illustrated in FIG. 3A, the frequencies of the received signal deviate upward in the graph, which means that the target is approaching.

Figure 2B:
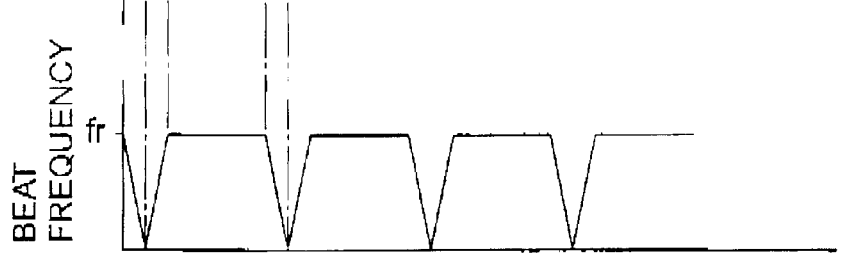
FIG. 2B is a graph for explaining the principle of detection of the FM-CW radar.
Figure 3B:
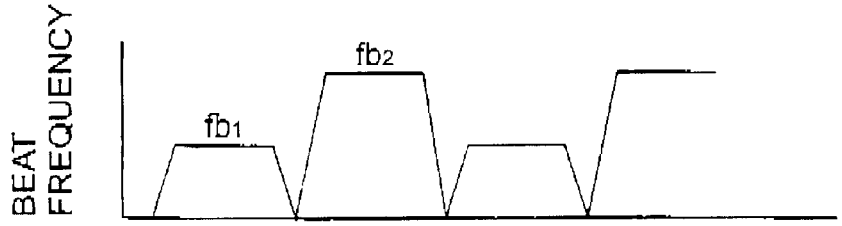
FIG. 3B is a graph for explaining the principle of detection of the FM-CW radar.

A beat signal can be obtained by mixing part of the transmitted signal in such a received signal. FIG. 2B and FIG. 3B are graphs to show beat frequencies when the relative velocity of the target is zero and V (V≠0), respectively, and their time axis (horizontal axis) is timed with that in FIG. 2A and FIG. 3A.

Now let fr be the beat frequency at the relative velocity of zero, fd be the Doppler frequency based on the relative velocity, fb1 be the beat frequency in a frequency-increasing interval (up interval), and fb2 be the beat frequency in a frequency-decreasing interval (down interval). Then the following equations hold.

$$fb1 = fr - fd \quad (1)$$

$$fb2 = fr + fd \quad (2)$$

Therefore, fr and fd can be computed from the following equations (3) and (4) if the beat frequencies fb1 and fb2 in the up interval and in the down interval of a modulation cycle are measured separately.

$$fr = (fb1 + fb2)/2 \quad (3)$$

$$fd = (fb2 - fb1)/2 \quad (4)$$

Once fr and fd are obtained, the distance R and velocity V of the target can be computed from the following equations (5) and (6).

$$R = (C/(4 \cdot \Delta F \cdot fm)) \cdot fr \quad (5)$$

$$V = (C/(2 \cdot f0)) \cdot fd \quad (6)$$

Here C represents the speed of light.

Since the distance R and velocity V of the target can be obtained for an arbitrary beam direction in this way, the direction, the distance, and the velocity of the target may be detected by successively computing the distances R and velocities V while carrying out the beam scan. This is the principle of the FM-CW radar.

The FM-CW radar apparatus of the present embodiment illustrated in FIG. 1 is also the DBF radar apparatus. Namely, this FM-CW radar apparatus is designed to use an array antenna composed of a plurality of antenna elements as a receiving antenna, digitize signals received by the respective antenna elements, convert the phase and amplitude of each signal in the signal processing section of a subsequent stage, and further execute composition of signals of all the antenna element channels, thereby forming directivity of the receiving antenna. A desired beam scan may thus be executed by carrying out the conversion with appropriate change in conversion amounts of the phase and amplitude from the signals once read in.

This radar apparatus is provided with a transmitter section 1, an array antenna 2, a changeover switch section 3, a receiving circuit section 4, and a digital signal processing section 5. The array antenna 2, the changeover switch section 3, and the receiving circuit section 4 compose a receiver section.

The transmitter section 1 is composed of a voltage-controlled oscillator 11 having the center frequency of f0 (for example, 76 GHz), a buffer amplifier 12, a transmission antenna 13, and an RF amplifier 14. The oscillator 11 outputs the modulated wave (transmitted signal) of f0±ΔF/2, based on a control voltage outputted from a dc power supply for modulation not illustrated. The modulated wave is amplified by the buffer amplifier 12 and is radiated as an electromagnetic wave from the transmission antenna 13. Part of the transmitted signal is amplified by the RF amplifier 14 to be supplied as a local signal for downconversion.

The array antenna 2 for reception has nine antenna elements corresponding to respective channels from the first channel (CH1) to the ninth channel (CH9). The changeover switch section 3 is comprised of a switch body 31 and a switch control 32. The switch body 31 has nine input terminals and one output terminal and each antenna element of the array antenna 2 is connected to a corresponding input terminal. The output terminal is designed to be connected to either one of the input terminals and the connection thereof is changed over properly in response to a changeover signal from the switch control 32. The changeover of connection is carried out electrically on the circuitry and the sequence of changeover will be described hereinafter.

The receiving circuit section 4 is composed of an RF amplifier 41, a mixer 42, an amplifier 43, a filter 44, and an A/D converter 45. The RF amplifier 41 amplifies a signal outputted from the output terminal of the switch body 31, which is a signal received by either antenna element of the array antenna 2, and the mixer 42 mixes the amplified signal with part of the transmitted signal from the RF amplifier 14. The received signal is downconverted by this mixing to generate a beat signal as a difference signal between the transmitted signal and the received signal. The beat signal is supplied via the amplifier 43 and the low-pass filter 44 to the A/D converter 45 to be converted into a digital signal at the timing of a signal from the switch control 32, i.e., at the timing of a clock signal fsw for execution of connection changeover in the switch body 31.

The digital signal processing section 5 executes the digital beamforming (DBF) operation with digital beat signals from the A/D converter 45 to detect the target from the result thereof.

Described next is the operation of the FM-CW radar apparatus constructed as described above.

Figure 4:
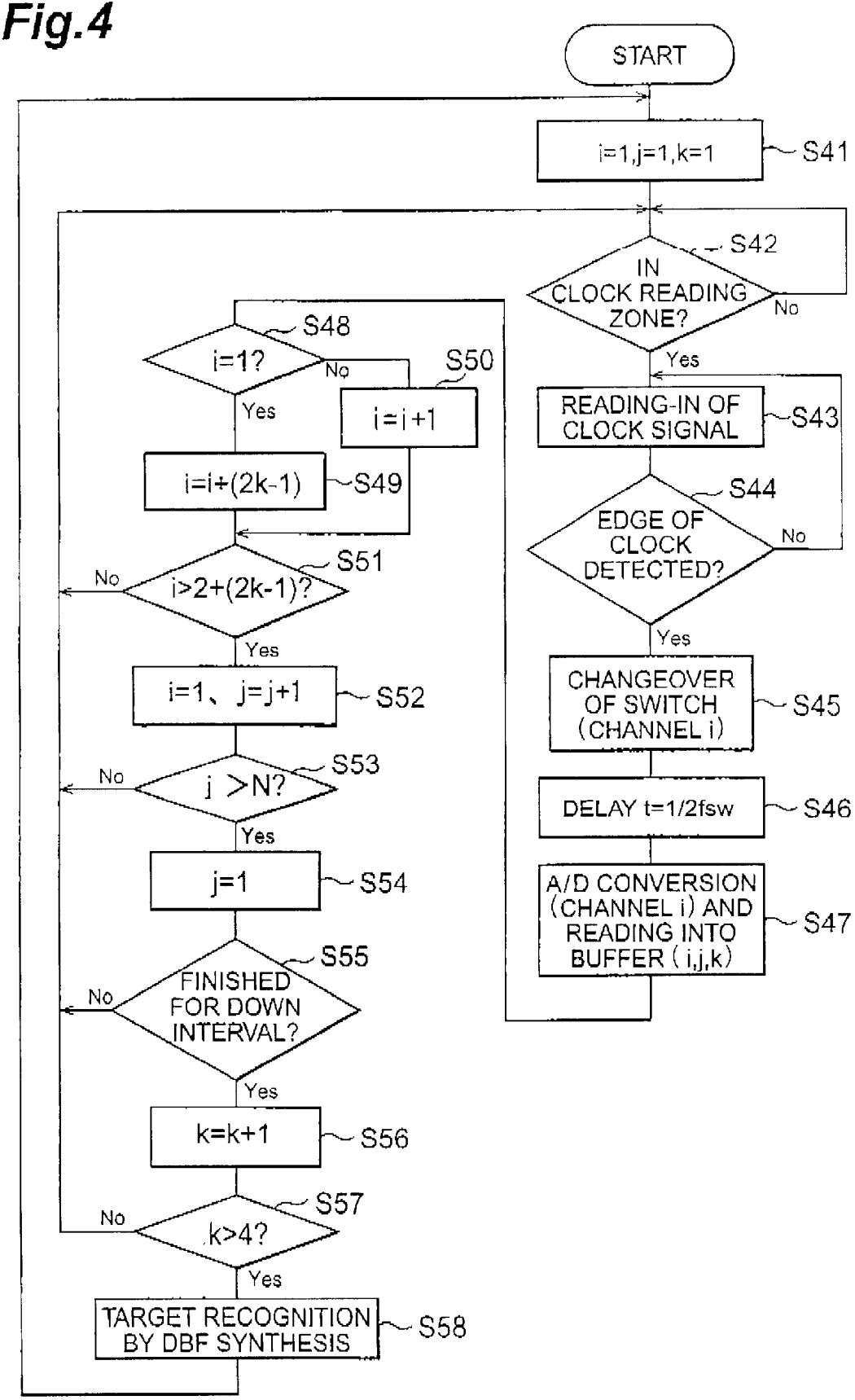
FIG. 4 is a flowchart to show the operation of the FM-CW radar apparatus of FIG. 1.
Figure 5:
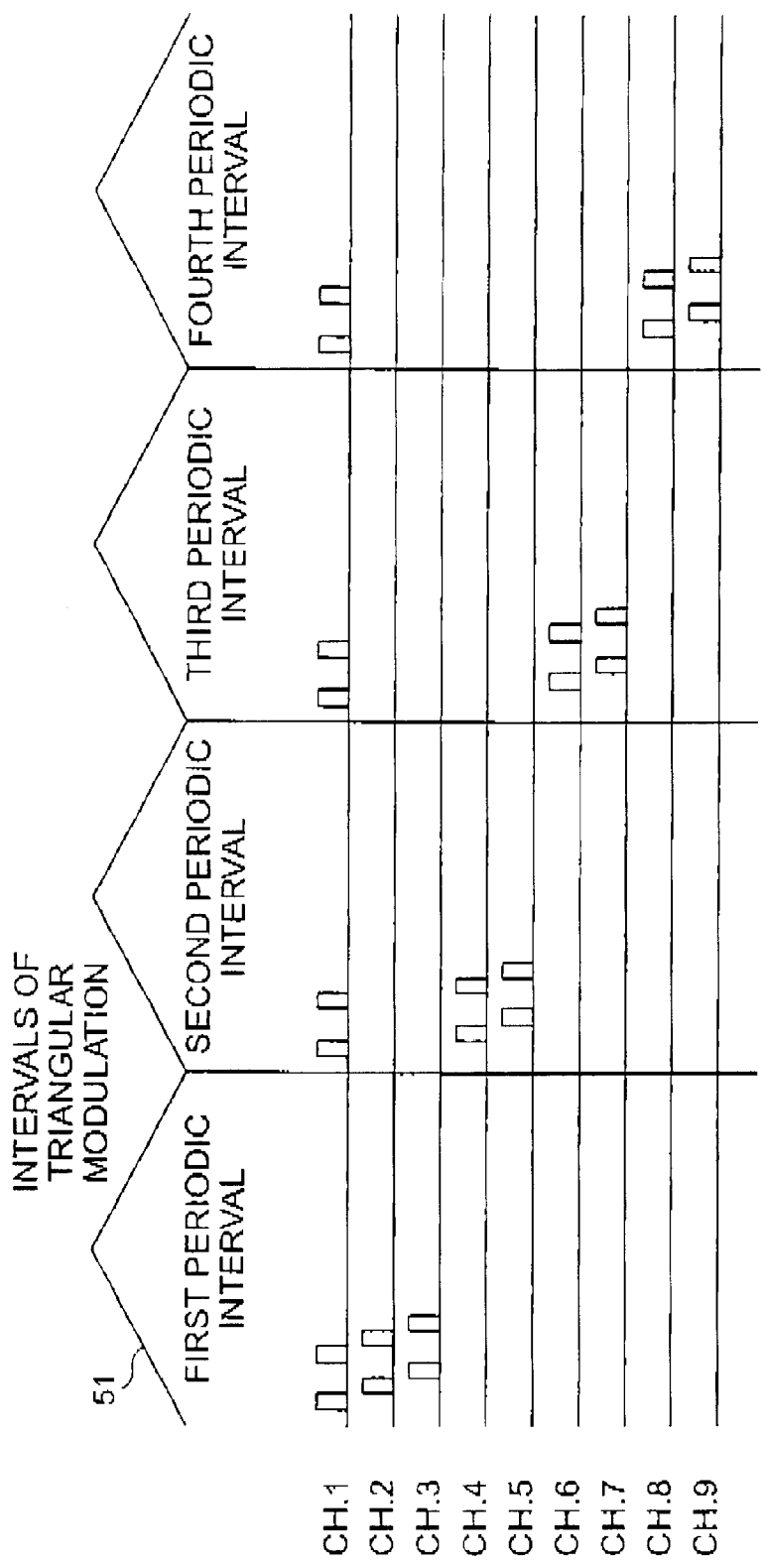
FIG. 5 is a timing chart to show connection timing of changeover switch 3 of the FM-CW radar apparatus of FIG. 1.

FIG. 4 is a flowchart to show the operation of the FM-CW radar apparatus and FIG. 5 is a timing chart to show the changeover timing sequence of the changeover switch section 3.

In the flowchart of FIG. 4, i indicates a channel-18 number of each antenna element, j a sampling number of a received wave in each of an up interval and a down interval of triangular modulation, and k a period number of triangular modulation. In the present embodiment, i takes values of 1 to 9, j values of 1 to N (for example, 128), and k values of 1 to 4.

First, in step S41 i, j, and k are set to "1" of their respective initial value. It is then determined in step S42 whether a signal is in a reading-in zone of a sampling clock signal. In the present embodiment a reading-in zone is a central section of each of the up interval and down interval of the triangular modulation. The reason is that higher linearity can be assured in the central part of each interval than near a change point from an up interval to a down interval or from a down interval to an up interval of the triangular modulation.

If the signal is in a clock signal reading-in zone the flow will proceed through step S43 to S44 and then to step S45 at a time of detecting an edge of a clock signal to effect changeover of the switch body 31. Since i=1 at present, this changeover causes the first antenna element ch1 to be connected to the switch body 31.

With this changeover of the switch, a signal received by the first antenna element ch1 is downconverted in the mixer 42 and a beat signal thereof is sent to the A/D converter 45.

Next, step S46 is to give a delay of half of a clock period (1/fsw) and step S47 thereafter is to carry out the A/D conversion of the beat signal by the A/D converter 45 to read its digital beat signal into a buffer of the digital signal processing section 5. The delay in step S46 is given for carrying out the A/D conversion operation at a center point of one antenna element connection period, which permits the A/D conversion to be executed during a stable period of connection. The reading operation of the digital beat signal into the buffer is carried out for each of i, j, and k and for each of up and down intervals, for the subsequent process.

After completion of this operation of one A/D conversion, the flow moves to step S48. The operation from step S48 to step S57 described below is a flow of determining the sequence of the antenna elements to be connected to the receiving circuit section 4 by the changeover switch section 3. In this embodiment selection of all the antenna element channels is completed using four repetition periods of the frequency modulation.

FIG. 5 is a timing chart to show an order of selection of the antenna element channels, in which the time is on the horizontal axis. In FIG. 5, CH.1 to CH.9 indicate the connection timing of the first to ninth antenna element channels, in which high levels represent connection. A waveform 51 represents the timing of triangular modulation. For easy understanding of illustration, the connection time (high level period) of each channel is illustrated as much longer than the actual connection time in the relation to the waveform 51.

As seen from this figure, the first, second, and third antenna elements are selected in the first periodic interval and these are connected repeatedly in order. In the second periodic interval the first, the fourth, and fifth antenna elements are selected and these are connected repeatedly in order. In the third periodic interval the first, sixth, and seventh antenna elements are selected and these are connected repeatedly in order. In the fourth periodic interval the first, eighth, and ninth antenna elements are selected and these are connected repeatedly in order.

The first antenna element is always selected as a reference antenna element in the first to the fourth periodic intervals, and the second to ninth antenna elements are assigned two each to the first to the fourth periodic intervals. A beat signal based on a signal received by the first antenna element is utilized as a reference signal for phase correction in the DBF synthesis described hereinafter.

The operation from step S48 to step S57 for carrying out such changeover connection of the antenna elements is as follows.

Step S48 is to determine whether i=1. If i=1 then the flow goes to step S49 to replace i with (i+(2k−1)). Unless i=1 the flow goes to step S50 to replace i with (i+1). After that, step S51 is to determine whether i is greater than (2+(2k−1)).

Since i=k=1 at present, the flow moves to step S49 to set i=2 and then returns via the determination in step S51 to step S42. Then a digital beat signal of a signal received by the second antenna element is read into the buffer through steps S42 to S47. Since i=2 at this point, the flow moves from step S48 to step S50 to set i=3 and again returns from step S51 to step S42. Then a digital beat signal of a signal received by the third antenna element is read into the buffer through steps S42 to S47.

Subsequent to it, the flow transfers from step S48 to step S50 to set i=4. Then step S51 results in making a positive judgment. Then the flow transfers to step S52 to set i=1 and also set j=2.

After that, the flow transfers to step S53 to compare j with N. The value N is the number of samplings in each antenna element channel in an up interval and in a down interval, and in this embodiment N=128, for example. Since j=2 at present, the flow returns to step S42 with i=1 and j=2. After that, digital beat signals of the first to the third antenna elements are read in successively before j becomes 3 in step S52.

Thereafter, digital beat signals of the first to the third antenna element channels are successively taken in similarly. After N digital beat signals have been taken in every channel, the flow moves to step S54, based on the determination in step S53, to return the value of j to "1" of its initial value.

Next step S55 is to determine whether the digital beat signal reading-in operation executed above is one in an up interval or in a down interval. Since the present status is just after completion of the reading-in in the up interval, the determination in step S55 is negative and thus the flow returns to step S42. Thereafter, digital beat signals of the first to the third antenna element channels are read in by 128 samples per channel in the down interval of the first periodic interval.

After completion of the digital beat signal reading-in operation in the down interval of the first periodic interval, the flow transfers from step S55 to step S56 to replace k with (k+1). Since k=1 at present, k=2 is set here and then the flow returns via the determination in step S57 to step S42.

By repeating the operation from step S42 to step S55 thereafter, the first, the fourth, and the fifth antenna elements are successively selected in each of the up interval and the down interval of the second periodic interval, as illustrated in FIG. 5, whereby the digital beat signals thereof are read in repeatedly.

When in step S56 k is set to 3, the first, the sixth, and the seventh antenna elements are successively selected in each of the up interval and down interval of the third periodic interval, as illustrated in FIG. 5, whereby the digital beat signals thereof are read in repeatedly. Further, when k=4, the first, the eighth, and the ninth antenna elements are successively selected in each of the up interval and down interval of the fourth periodic interval, whereby the digital beat signals thereof are read in repeatedly.

After completion of the above processing, all the digital beat signals of the signals received by all the antenna element channels have been read in the buffer of the digital signal processing section 5. At this time, the value of k is set as k=5 in step S56 and step S57 results in the positive. Thus the flow goes to step S58.

Step S58 is to execute complex FFT operation of each channel, DBF synthesis, and recognition operation of target object based on the result thereof. After step S58, the flow returns to step S41 to execute the processing described above, and this is repeated thereafter.

Next, the procedures of the DBF synthesis in the digital signal processing section 5 will be described referring to the flowchart of FIG. 6.

Step S60 is to carry out the complex FFT operation, as a pretreatment for the DBF synthesis, for the digital beat signals in each channel and step S61 is to read in this FFT data of each channel. This FFT operation yields frequency peaks according to the target in every channel. Since it is sufficient that the DBF synthesis is carried out selectively for the frequency peaks, step S62 is a step of extracting frequency points for the DBF synthesis.

Next, with the frequency points extracted in step S62, the operation from step S63 to step S67 is carried out to convert and correct the phase and amplitude in each channel. Step S63 is to determine whether data is of the first periodic interval out of the first to the fourth periodic intervals of the frequency modulation. If the interval is either of the second periodic interval to the fourth periodic interval, the flow goes to step S65 to carry out phase compensation between intervals based on the reference of the first antenna element channel.

It is conceivable that between different periodic intervals of the frequency modulation for reading-in of digital beat signals there is change in the distance to the target during the time difference, and the received signals thus have a phase difference in each periodic interval.

In this embodiment, therefore, the first antenna element is used as a reference antenna element, the digital beat signals of the signals received by the first antenna element are read in all the periodic intervals, and phases of the digital beat signals based on the received signals by the other antenna elements are corrected using the phase difference between the intervals. The phases stated herein means those of the original signals and those phases are also reserved in the beat signals after downconversion. Thus the phase differences can be detected.

Since in the second periodic interval the digital beat signals based on the received signals by the first, the fourth, and the fifth antenna elements are read in, the phase difference is obtained between the phase gained from the digital beat signal of the first antenna element therein and the phase gained from the digital beat signal of the first antenna element in the first periodic interval. Then the phases of the received signals by the fourth and fifth antenna elements are reversed by the degree of the phase difference, whereby they may be handled as signals on an equal basis to those read in the first periodic interval.

By executing the like correction in the third and fourth periodic intervals, the received signals by all the antenna elements may be handled as signals read in the first periodic interval.

Step S64 is to carry out initial phase correction, initial amplitude correction, and amplitude distribution control specific to the apparatus, which is commonly carried out in the DBF synthesis, in each channel.

Next, step S66 is to execute phase rotation based on a directional angle selected at present, and vector composition between channels. Compensation for the phase delay by the changeover switch is also carried out herein.

After completion of the vector composition for all the antenna element channels, the flow moves to step S68 to extract information about peak frequencies resulting from the composition.

It is determined in step S69 whether this extraction of information about the peak frequencies is finished for all the frequencies extracted in step S62, as those to be subjected to the DBF synthesis. After completion of the extraction of information for all the frequencies to be subjected to the DBF synthesis, the flow transfers to step S70 to shift the directional angle by 0.5° and then the operation from step S63 to step S69 is executed again. This operation is repeated forty one times at intervals of 0.5° from −10° to +10°, whereby the scan based on the DBF synthesis is achieved in the resolution of 0.5°.

Figure 6:
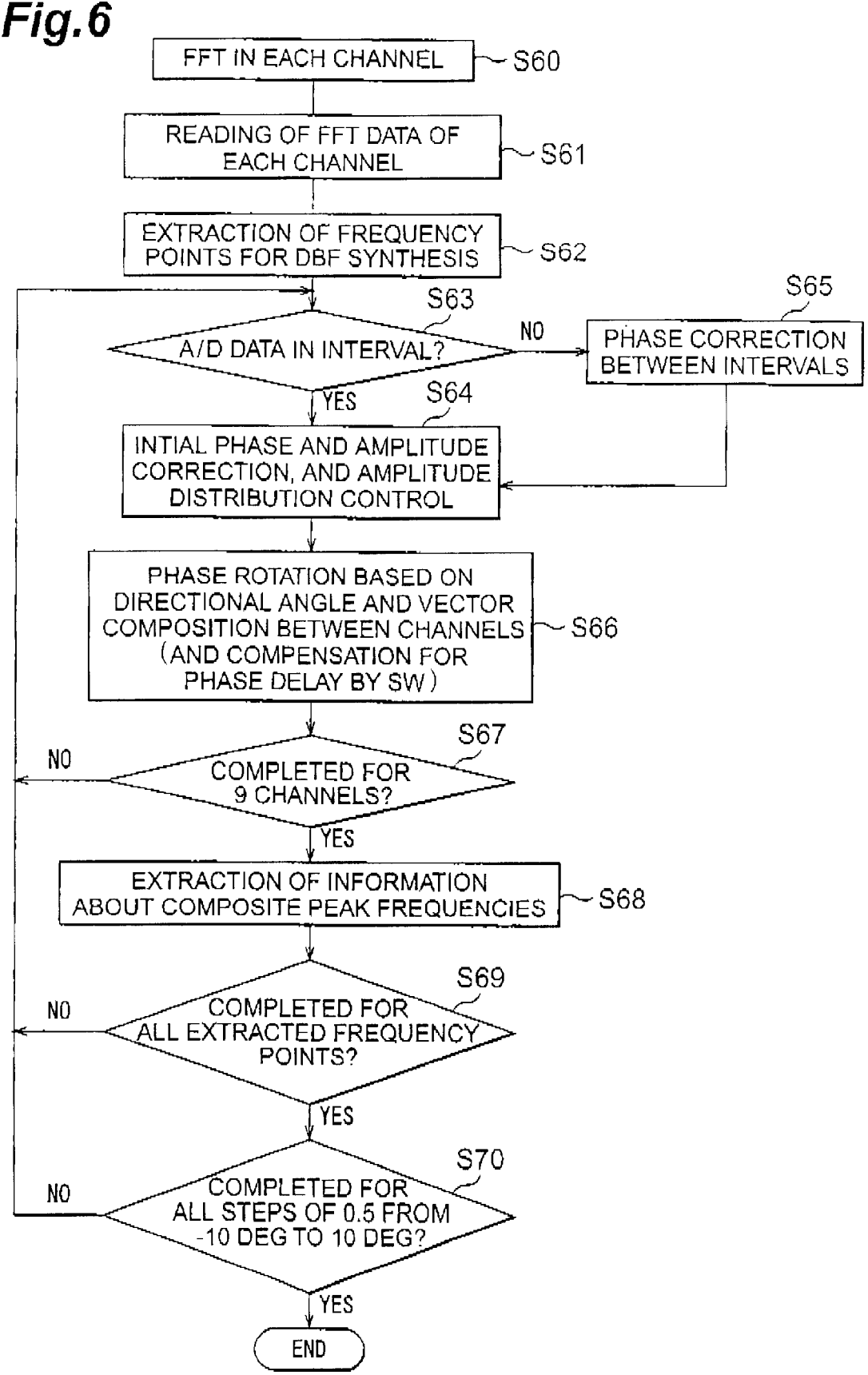
FIG. 6 is a flowchart to show procedures of the DBF synthesis.

The FFT operation and DBF synthesis illustrated in FIG. 6 are carried out in each of the up interval data and down interval data. After that, pairing is carried out between frequency peaks in the up interval and in the down interval to obtain information about the velocity, distance, and direction of the target object, based on the result thereof.

Figure 7:
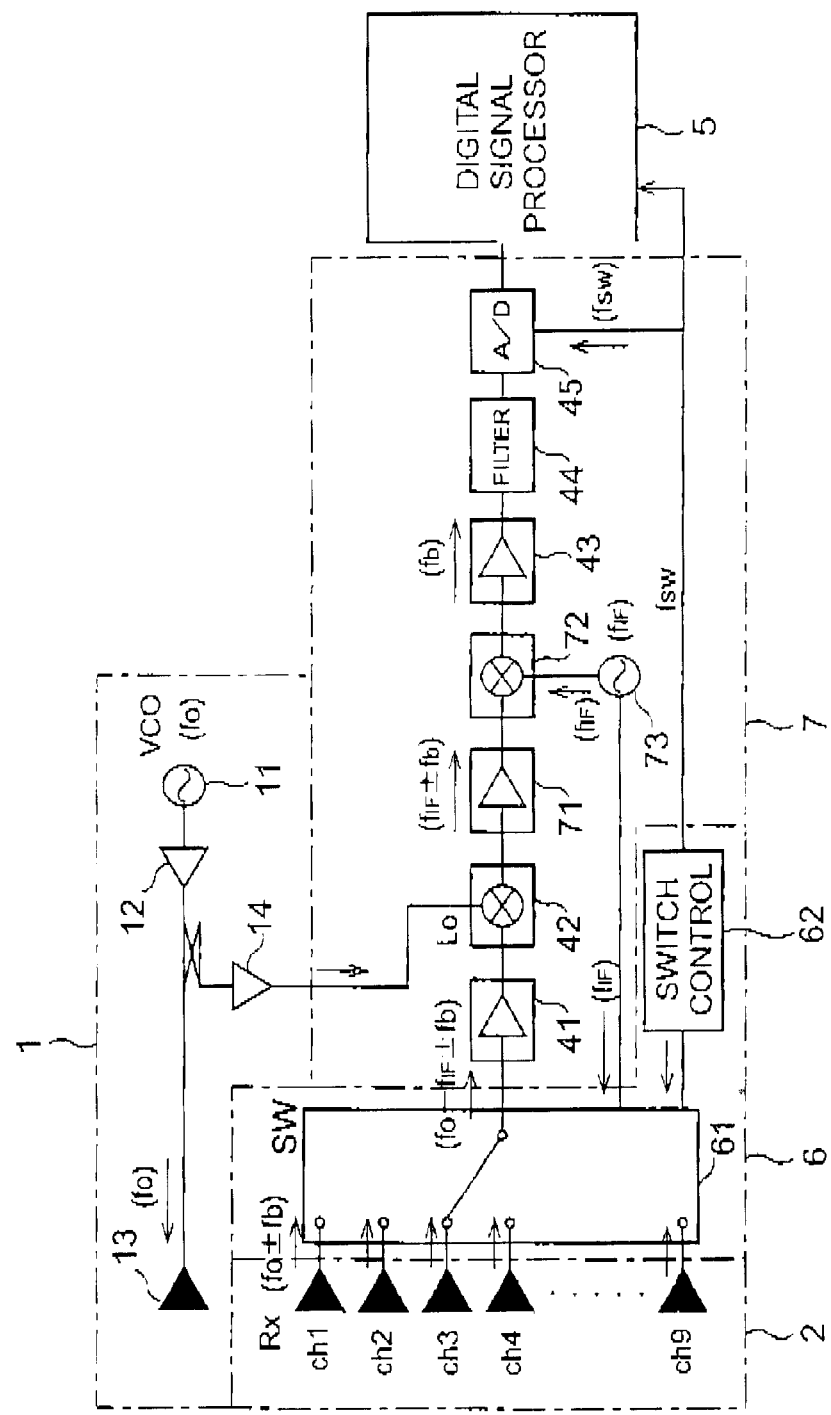
FIG. 7 is a structural diagram to show another FM-CW radar apparatus as a second embodiment of the present invention.

Next, another embodiment of the present invention will be described. FIG. 7 is a diagram to show the structure of the FM-CW radar apparatus as a second embodiment of the present invention. The FM-CW radar apparatus of the first embodiment is designed to effect the homodyne detection, whereas the radar apparatus of the present embodiment is designed to decrease the noise by carrying out the heterodyne detection.

In FIG. 7, like elements are denoted by identical reference symbols to those in FIG. 1, and the detailed description thereof will be omitted herein. The changeover switch section 6 is composed of a switch body 61 and a switch control 62, similar to the changeover switch section 3 of FIG. 1. The switch body 61 has nine input terminals and one output terminal, and the output terminal is connected to either one of the input terminals. The connection of the output terminal is changed over at regular intervals according to a changeover signal from the switch control 62. The difference from the switch body 31 of the first embodiment is that the connection between the input terminals and the output terminal is interrupted by intermittent signals supplied from the outside. The switch control 62 is the same as that 32 of the first embodiment.

The receiving circuit section 7 is constructed in such structure that an IF amplifier 71 and a second mixer 72 are interposed in series between the mixer 42 and the amplifier 43 of the receiving circuit section 4 of FIG. 1. Further, it has an oscillator 73 for outputting the intermittent signals $f_{IF}$ having the frequency equal to several ten times that of the changeover signal fsw. An example of the frequencies of the respective signals is as follows; the frequency f0 of the transmitted signal is, for example, 76 GHz, the frequency $f_{IF}$ of the intermittent signals in an intermediate frequency band is, for example, 100 MHz, the frequency of the changeover signal is, for example, 5 MHz, and the frequency of the beat signals is, for example, DC to 100 kHz.

Figure 8:
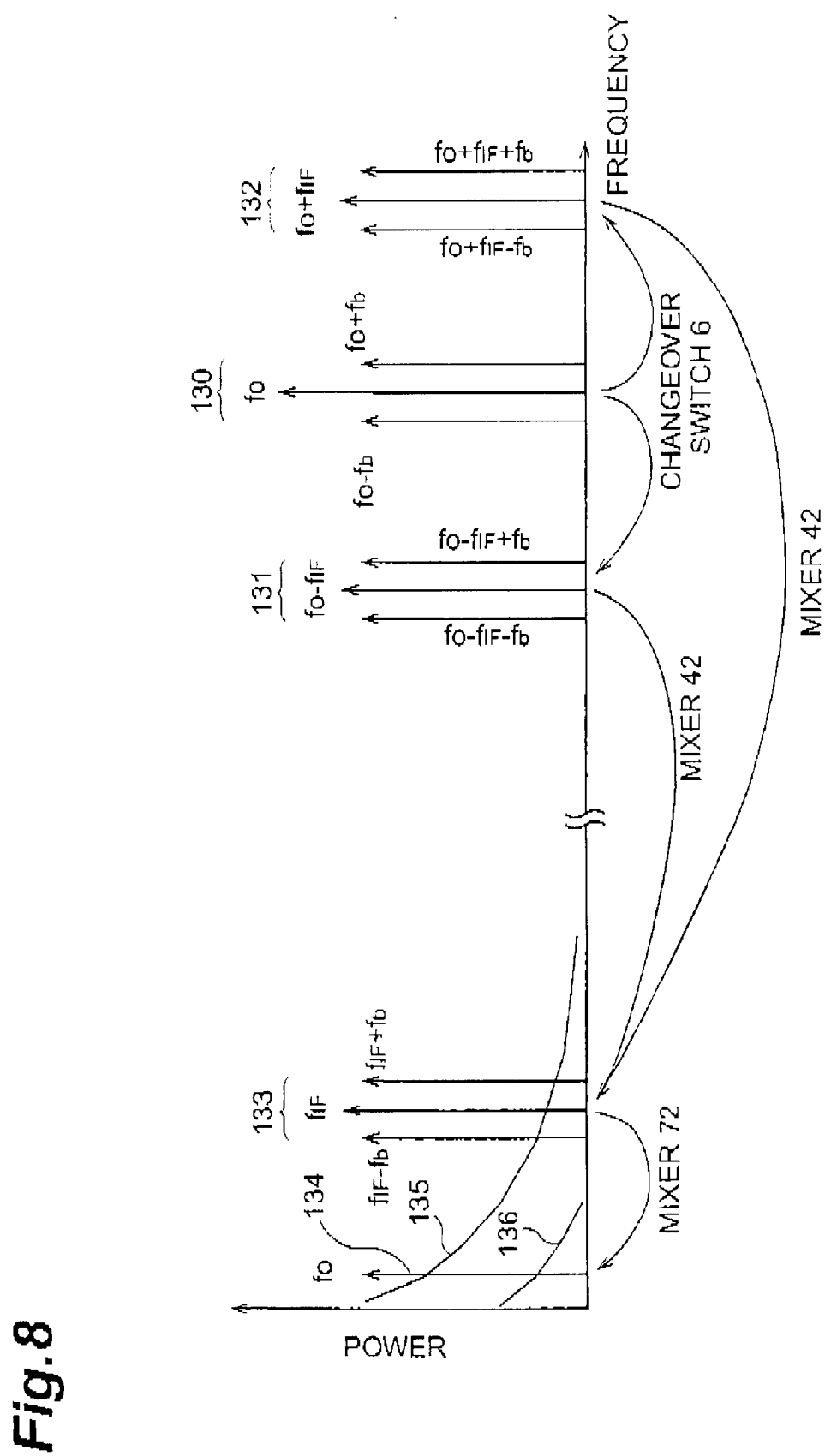
FIG. 8 is a spectrum map to show a way of frequency conversion.

FIG. 8 is a spectral map to show the way of frequency conversion in the signal processing operation in the present embodiment. In the FM-CW radar apparatus of the present embodiment, a received signal 130 is replaced with signals 131 and 132 by on/off according to the intermittent signals in the changeover switch section 6 and thereafter they are downconverted to an intermediate signal 133 in the mixer 42. Subsequent to it, the intermediate signal 133 is downconverted to a beat signal 134 in the second mixer 72.

In FIG. 8, a curve 136 indicates a noise floor of the mixer 42 and a curve 136a noise floor of the second mixer 72. As seen from this figure, the mixer 42 downconverts the signals into the IF zone where the influence of noise is low. Then the second mixer 72 having lower noise in the low frequency band than the mixer 42 downconverts the signal to the beat signal. Therefore, the present embodiment may expand the noise margin considerably, as compared with the homodyne method.

Since the mixer 42 has the very wide bandwidth, there normally appears a lot of 1/f noise and FM-AM conversion noise by the FM-CW method in the low frequency range. In contrast, since the second mixer 72 has the narrow bandwidth, the noise floor is lowered. The present embodiment achieves the expansion of noise margin by making use of such action.

If the IF amplifier 71 prior to the second mixer 72 has a narrower band, the IF signal may be separated from the FM-AM conversion noise appearing in the low frequency range, so that the low-frequency noise may be decreased further.

In the first and second embodiments the number of channels of the antenna elements was nine, but the detection accuracy may be enhanced further by increasing the number of channels.

As described above, the FM-CW radar apparatus of the present invention needs only one set of the expensive devices necessary for the downconversion, for example, the RF amplifier, the high-frequency mixer, etc., regardless of the number of antenna elements. Therefore, the whole apparatus may be constructed at low cost and in compact size.

In addition, the switch means connects only part of the antenna elements to the beat signal generating circuit in one period of the repetition periods of frequency modulation, so that the switching frequency may be lower than in the case wherein all the antenna elements are connected to the beat signal generating circuit in one period. Further taking it into consideration that a beat signal is sampled every changeover of connection, the A/D conversion rate may also be decreased with decrease in the switching frequency. This permits use of cheaper switch element and A/D converter.

What is claimed is:

1. An FM-CW radar apparatus comprising:

a transmitter section for transmitting a frequency-modulated continuous wave as a transmitted wave having repetition periods of frequency modulation;

a receiver section for receiving a radio wave resulting from reflection of said transmitted wave from a target, as a received wave, by a receiving antenna comprising an array of antenna elements, for generating a beat signal which is a difference between the transmitted wave and the received wave in each channel of the respective antenna elements, and for converting the beat signal to a digital beat signal by A/D conversion; and a signal processing section for effecting a beam scan by executing a digital beamforming operation with said digital beat signal and detecting said target from the result thereof, wherein said receiver section comprises switch means for selectively connecting any one of said antenna elements to a circuit for generating said beat signal, and wherein said switch means connects only some of said antenna elements to said beat signal generating circuit in any one of said repetition periods of frequency modulation.

2. The FM-CW radar apparatus according to claim 1, wherein said switch means is arranged so that at least part of one antenna element or two or more antenna elements connected to said beat signal generating circuit in an arbitrary period of the repetition periods of said frequency modulation is different from one antenna element or two or more antenna elements connected to said beat signal generating circuit in another period different therefrom.

3. The FM-CW radar apparatus according to claim 2, wherein said switch means is arranged so that all said antenna elements are connected to said beat signal generating circuit during plural periods of the repetition periods of said frequency modulation.

4. The FM-CW radar apparatus according to claim 3, wherein said switch means selects one of said antenna elements as a reference antenna element in each period of the repetition periods of said frequency modulation.

5. The FM-CW radar apparatus according to claim 4, wherein said signal processing section corrects phases of waves received by the antenna elements other than the reference antenna element, based on a phase difference of a wave received by the reference antenna element in each period of the repetition periods of said frequency modulation.

* * * * *

UNITED STATES PATENT AND TRADEMARK OFFICE
CERTIFICATE OF CORRECTION

PATENT NO.    : 6,445,339 B1
DATED         : September 3, 2002
INVENTOR(S)   : Yukinori Yamada It is certified that error appears in the above-identified patent and that said Letters Patent is hereby corrected as shown below:

<u>Title page,</u>
Item [63], "PCT/JP99/07484" should read -- PCT/JP99/01484 --.

Signed and Sealed this

Eleventh Day of February, 2003

JAMES E. ROGAN
*Director of the United States Patent and Trademark Office*